United States Patent
Iwata et al.

(10) Patent No.: US 12,039,786 B2
(45) Date of Patent: Jul. 16, 2024

(54) LEARNING APPARATUS, ESTIMATION APPARATUS, LEARNING METHOD, ESTIMATION METHOD, AND PROGRAM

(71) Applicant: NIPPON TELEGRAPH AND TELEPHONE CORPORATION, Tokyo (JP)

(72) Inventors: Tomoharu Iwata, Tokyo (JP); Naoki Marumo, Tokyo (JP); Hitoshi Shimizu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 486 days.

(21) Appl. No.: 17/414,308

(22) PCT Filed: Dec. 3, 2019

(86) PCT No.: PCT/JP2019/047235
§ 371 (c)(1),
(2) Date: Jun. 15, 2021

(87) PCT Pub. No.: WO2020/129621
PCT Pub. Date: Jun. 25, 2020

(65) Prior Publication Data
US 2022/0051034 A1 Feb. 17, 2022

(30) Foreign Application Priority Data

Dec. 17, 2018 (JP) .................................. 2018-235850

(51) Int. Cl.
G06V 20/58 (2022.01)
G06F 18/214 (2023.01)
G08G 1/01 (2006.01)

(52) U.S. Cl.
CPC ............ G06V 20/58 (2022.01); G06F 18/214 (2023.01); G08G 1/0104 (2013.01); G08G 1/0133 (2013.01)

(58) Field of Classification Search
CPC ............ G06V 20/58; B60W 30/18009; B60W 2554/4029; B60W 2554/4049; G06F 18/214; G06N 20/00; G08G 1/01
See application file for complete search history.

(56) References Cited

U.S. PATENT DOCUMENTS

2017/0343669 A1* 11/2017 Tasaki ........................ G06T 7/20
2018/0335307 A1* 11/2018 Chen .................... G01C 21/3815
(Continued)

FOREIGN PATENT DOCUMENTS

EP 3249629 A2 * 11/2017 ............. G01S 17/06
JP H0540896 A 2/1993
(Continued)

OTHER PUBLICATIONS

Moving Objects Analytics: Survey on Future Location & Trajectory Prediction Methods—Jul. 2018 (Year: 2018).*

(Continued)

*Primary Examiner* — Nizar N Sivji (57) ABSTRACT

A learning device includes: input means for inputting route information on a set of routes each constituted by one or more ways, and passing mobile object information that indicates the number of passing mobile objects on an observed way, out of the one or more ways, at each time point; and learning means for learning parameters of a model in which a travel speed of the mobile objects is taken into consideration, using the route information and the passing mobile object information.

17 Claims, 4 Drawing Sheets

(56) References Cited

U.S. PATENT DOCUMENTS

| | | | | |
|---|---|---|---|---|
| 2018/0370526 A1* | 12/2018 | Ohmura | | G06V 20/584 |
| 2019/0188359 A1* | 6/2019 | Van De Stolpe | | G16C 20/70 |
| 2019/0370580 A1* | 12/2019 | Aoi | | G06V 10/454 |
| 2020/0057442 A1* | 2/2020 | Deiters | | G06V 20/58 |
| 2022/0043456 A1* | 2/2022 | Shalev-Shwartz | | G06V 20/56 |
| 2023/0195124 A1* | 6/2023 | Okazaki | | G05D 1/0223 |
| | | | | 701/50 |

FOREIGN PATENT DOCUMENTS

| | | |
|---|---|---|
| JP | 200430450 A | 1/2004 |
| JP | 2010250586 A | 11/2010 |
| JP | 2018112824 A | 7/2018 |

OTHER PUBLICATIONS

Shimizu et al. (2018) "Improving route traffic estimation by considering staying population" PRIMA 2018, Oct. 29, 2018.

\* cited by examiner

LEARNING APPARATUS, ESTIMATION APPARATUS, LEARNING METHOD, ESTIMATION METHOD, AND PROGRAM

CROSS-REFERENCE TO RELATED APPLICATIONS

This application is a U.S. 371 Application of International Patent Application No. PCT/JP2019/047235, filed on 3 Dec. 2019, which application claims priority to and the benefit of JP Application No. 2018-235850, filed on 17 Dec. 2018, the disclosures of which are hereby incorporated herein by reference in their entireties.

TECHNICAL FIELD

The present invention relates to a learning device, an estimation device, a learning method, an estimation method, and a program.

BACKGROUND ART

To recognize the traffic congestion state of roads is an important task in view of security, convenience, and the like. Accordingly, for example, deploying sensors and people has been conventionally performed to recognize the traffic congestion state of roads, but deployment of sensors and people on many roads, or the like incurs a huge amount of cost.

To solve this, a method has been proposed in which a tomographic model is used to recognize the traffic congestion state of roads (see NPL 1, for example).

CITATION LIST

Non Patent Literature

[NPL 1] Hitoshi Shimizu, Tatsushi Matsubayashi, Yusuke Tanaka, Tomoharu Iwata, Naonori Ueda and Hiroshi Sawada. "Improving route traffic estimation by considering staying population", PRIMA, 2018.

SUMMARY OF THE INVENTION

Technical Problem

However, in the conventional methods, the speeds of mobile objects (such as people and vehicles, for example) were not taken into consideration. It is conceivable that taking into consideration the speeds of mobile objects can allow more accurate estimation of the traffic congestion state of roads (such as, for example, the number of mobile objects passing on a way during a certain time width, or the number of mobile objects present on a certain route during a certain time width).

The present invention was made in view of the aforementioned circumstances, and an object thereof is to estimate the traffic congestion state of a way more accurately.

Means for Solving the Problem

In order to achieve the above-described object, the learning device according to an embodiment of the present invention includes: input means for inputting route information on a set of routes each constituted by one or more ways, and passing mobile object information that indicates the number of passing mobile objects on an observed way, out of the one or more ways, at each time point; and learning means for learning parameters of a model in which a travel speed of the mobile objects is taken into consideration, using the route information and the passing mobile object information.

Furthermore, the estimation device according to the embodiment of the present invention includes: input means for inputting route information on a set of routes each constituted by one or more ways, passing mobile object information that indicates the number of passing mobile objects on an observed way, out of the one or more ways, at each time point, and learned parameters of a model that is used to estimate the number of mobile objects that are to pass on the one or more ways at each time point taking into consideration a travel speed of the mobile objects; and estimation means for estimating the number of mobile objects that are to pass on the one or more ways at each time point, based on the model, using the route information, the passing mobile object information, and the learned parameters of the model.

Effects of the Invention

It is possible to estimate the traffic congestion state of a way more accurately.

DESCRIPTION OF EMBODIMENTS

Hereinafter, an embodiment of the present invention will be described. The embodiment of the present invention describes a learning device 10 and an estimation device 20 that estimate, upon input of the number of mobile objects passing on some of roads and route information, the number of mobile objects that are to pass on each way and the number of mobile objects that are to pass on each route.

Note that in the embodiment of the present invention, description is given taking a case where a mobile object is a pedestrian as an example, but the present invention is not limited to this case. The embodiment of the present invention is also applicable to any mobile object such as an automobile and a bicycle, for example.

Also, in the embodiment of the present invention, description is given taking a case where a way is a road as an example, but the present invention is not limited to this case. The embodiment of the present invention is also applicable to any way such as a walkway in an event site and an express highway, for example.

As described above, in the embodiment of the present invention, it is assumed that route information and information regarding the number of passing people (passing people count information), which is an example of the number of passing mobile objects, are given. Here, the route information $$R = \{r_j\}_{j=1}^{J} \qquad \text{[Math. 1]}$$

is a set of routes on which a pedestrian can travel, where J is the number of routes, $$r_j = (r_{j_1}, \ldots, r_{jK_j}) \quad \text{[Math. 2]}$$

indicates a series of roads constituting a route j, $K_j$ denotes the number of roads constituting the route j, and $r_{jK} \in L$ denotes the k-th road of the route j, where L denotes a road set. It is assumed that each road $i \in L$ has a length $d_i$ and a width $w_i$.

Also, the passing people count information $$X_{obs} = \{\{x_{ti}\}_{i \in L_{obs}}\}_{t=1}^T \quad \text{[Math. 3]}$$

indicates the number of people passing on an observed road at each time point, $x_{ti}$ denotes the number of people passing on the road i at time t, $L_{obs}$ denotes a set of observed roads, and T denotes the number of time points. Note that in the embodiment of the present invention, it is assumed that $L_{obs}$ denotes a proper subset of the road set L, but the present invention is not limited to this. For example, $L_{obs} = L$ may be applied. Also, $L_{obs}$ may be an empty set.

In the embodiment of the present invention, with respect to a road set that has not yet been observed $$L_{uno} = L \backslash L_{obs}, \quad \text{[Math. 4]}$$

the number of people that are to pass (passing people count) at each time point $$x_{uno} = (\{\{x_{ti}\}_{i \in L_{uno}}\}_{t=1}^T \quad \text{[Math. 5]}$$

is estimated.

Accordingly, in the embodiment of the present invention, a route travel model in which the speed of a pedestrian is taken into consideration (that is, a travel model for a pedestrian for each route with the speed of the pedestrian taken into consideration) is considered, and the learning device 10 learns the route travel model so that the passing people count estimated using this route travel model, and the observed passing people count match each other. Note that, here, the number of people for each route is also estimated. Then, using the learned route travel model learned by the learning device 10, the estimation device 20 estimate the passing people count $X_{uno}$ at each time point with respect to the road set $L_{uno}$ that has not yet been observed. Accordingly, the number of people for each route (hereinafter, referred to also as "per-route people count"), and the number of passing people for each road can be obtained, and thus it is possible to recognize the traffic congestion state of the roads.

<Functional Configurations of Learning Device 10 and Estimation Device 20>

Figure 1:
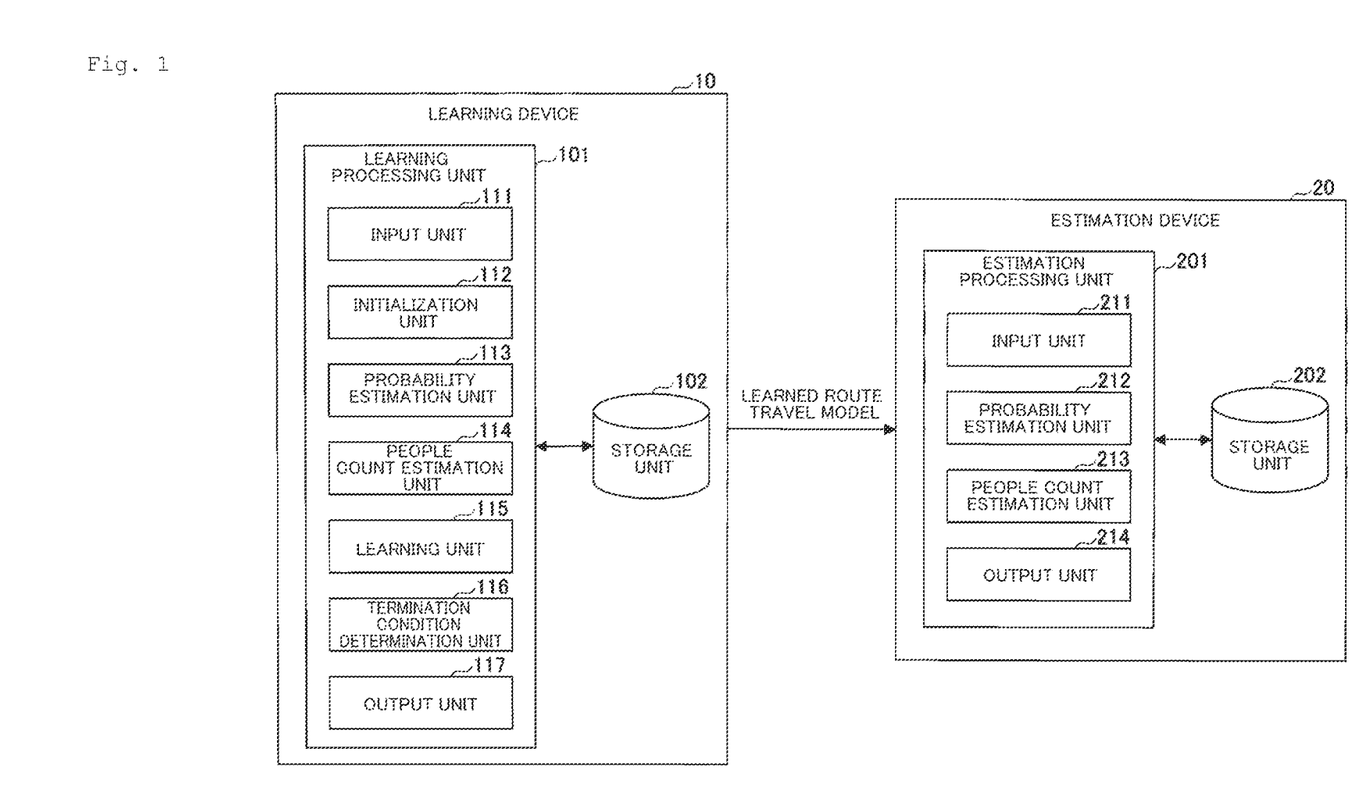
FIG. 1 is a diagram illustrating an example of functional configurations of a learning device and an estimation device according to an embodiment of the present invention.

First, the functional configurations of the learning device 10 and the estimation device 20 according to the embodiment of the present invention are described with reference to FIG. 1. FIG. 1 is a diagram illustrating an example of the functional configurations of the learning device 10 and the estimation device 20 according to the embodiment of the present invention.

<<Learning Device 10>>

As shown in FIG. 1, the learning device 10 according to the embodiment of the present invention includes a learning processing unit 101 and a storage unit 102.

The learning processing unit 101 executes processing (hereinafter, referred to also as "learning processing") for learning the route travel model in which the speed of a pedestrian is taken into consideration. The storage unit 102 stores various types of data (such as route information and passing people count information, for example) for use in the learning processing, and processing results of the learning processing (such as learned route travel model, for example).

Here, the learning processing unit 101 includes an input unit 111, an initialization unit 112, a probability estimation unit 113, a people count estimation unit 114, a learning unit 115, a termination condition determination unit 116, and an output unit 117.

The input unit 111 inputs route information R and on-route people count information $X_{obs}$. Note that the input unit 111 may input the route information R and the on-route people count information $X_{obs}$ that are stored in the storage unit 102, or may receive the route information R and the on-route people count information $X_{obs}$ from another device connected via a communication network, and input the received information. Alternatively, the input unit 111 may input either of the route information R and the on-route people count information $X_{obs}$ from the storage unit 102, and may receive the other information from another device, and input it.

The initialization unit 112 initializes the per-route people count, the congestion degree, and predetermined parameters. Here, assuming that the route travel model is denoted by $\Omega$, the per-route people count is denoted by Y, the congestion degree is denoted by C, the parameters are denoted by $\sigma$, a, b, and $v_{max}$, $\Omega = \{Y, C, \sigma, a, b, v_{max}\}$ is given. That is to say, these per-route people count Y, congestion degree C, and parameters $\sigma$, a, b, and $v_{max}$ serve as estimation targets and learning targets. Note that details of the congestion degree C. and the parameters $\sigma$, a, b, and $v_{max}$ will be described later.

The probability estimation unit 113 uses the congestion degree C. and the route information R to estimate a transition probability and a passing probability. The congestion degree C. is a set of congestion degrees (population density) of roads at each time point. Also, the transition probability refers to a probability that a pedestrian present on a certain road in a route transitions (travels) to another road within the same time, and the passing probability refers to a probability that a pedestrian present on a certain road in a route passes on another road within the same time.

Here, the probability estimation unit 113 can estimate the transition probability and the passing probability in the following manner.

The speed of a pedestrian varies depending on the congestion degree of the road on which this pedestrian is present. That is to say, the pedestrian cannot quickly travel on a road with congestion. Accordingly, a relational expression between the speed of a pedestrian and the congestion degree is used. As such a relational expression, the relational expression given by the following Expression (1) can be used, for example.

[Math. 6]

$$v(c_{ti}) = \frac{v_{max}}{1 + \exp(a(c_{ti} - b))} \quad (1)$$

Where, $c_{ti}$ denotes the congestion degree of the road i at the time t, $v(c_{ti})$ denotes the speed of a pedestrian on the road i at the time t, $v_{max} > 0$ denotes the maximal velocity (note however that in the present specification, "velocity" and "speed" are not distinguished, and "velocity" also means speed), a>0 indicates the attenuation degree of the velocity relative to the congestion degree, and b>0 indicates the congestion degree when the velocity is a half of the maximal velocity.

Note that the congestion degree C. is given as follows.

$$C = \{\{c_{ti}\}_{i \in L}\}_{t=1}^{T} \quad \text{[Math. 7]}$$

Also, a probability of a time period to be taken for passing through the road i at the time t is considered. Assuming that the time period is denoted by $\tau_{ti}$, normal distribution can be used, for example, as given by the following Expression (2).

[Math. 8]

$$\tau_{ti} \sim \mathcal{N}(\tau | \mu_{ti}, \sigma_{ti}^2) \quad (2)$$

Here, $$\mathcal{N}(\cdot | \mu, \sigma^2) \quad \text{[Math. 8]}$$

denotes the normal distribution of average $\mu$ and dispersion $\sigma^2$. Note that instead of the normal distribution, another distribution such as, for example, gamma distribution may be used. The average time period $\mu_{ti}$ for passing through the road i at the time t can be calculated with the following Expression (3), using the velocity $v(c_{ti})$ and the road length $d_i$.

[Math. 10]

$$\mu_{ti} = \frac{d_i}{v(c_{ti})} \quad (3)$$

Here, using the probability of the time period to be taken for passing through the road i at the time t, a probability of a time period to be taken for a pedestrian present on the k-th road of the route j at the time t to pass through the k'-th road is calculated. This probability can be calculated using the following Expression (4) when using the above-described Expression (2).

[Math. 11]

$$\tau_{tjkk'} \sim \mathcal{N}\left(\tau \bigg| \sum_{\ell=k}^{k'} \mu_{tr_{j\ell}}, \sum_{\ell=k}^{k'} \sigma_{tr_{j\ell}}^2\right) \quad (4)$$

With the above-described measures, the probability estimation unit 113 can calculate a probability (that is, the passing probability $\varphi_{jtkk'}$) that the pedestrian present on the k-th road of the route j at the time t may pass through the k'-th road within the same time, using the following Expression (5).

[Math. 12]

$$\phi_{jtkk'} = \int_{-\infty}^{\Delta} \mathcal{N}\left(\tau \bigg| \sum_{\ell=k}^{k'} , \sum_{\ell=k}^{k'} \sigma_{tr_{j\ell}}^2\right) d\tau = F\left(\Delta \bigg| \sum_{\ell=k}^{k'} \mu_{tr_{j\ell}}, \sum_{\ell=k}^{k'} \sigma_{tr_{j\ell}}^2\right) \quad (5)$$

Where $F(\cdot | \mu, \sigma^2)$ denotes a cumulative density function of the normal distribution of the average $\mu$ and the dispersion $\sigma^2$, $\Delta$ denotes the time width of the time t (that is, the time width between the time t and the time t' that follows this time t).

Also, the probability estimation unit 113 uses the passing probability $\varphi_{jtkk'}$ calculated using the above-described Expression (5) to calculate a probability (that is, the transition probability $\theta_{jtkk'}$) that the pedestrian transitions (moves) from the k-th road to the k'-th road on the route j at the time t using the following Expression (6).

[Math. 13]

$$\theta_{jtkk'} = \phi_{jtk,k'-1} - \phi_{jtkk'} \quad (6)$$

Note that the probability that the pedestrian is present on the same road can be calculated through $\theta_{jtkk} = 1 - \varphi_{jtkk}$.

The people count estimation unit 114 estimates the number of people that are to pass and the congestion degree, suing the per-route people count Y, the transition probability $\theta$, and the passing probability $\varphi$. Note that the per-route people count Y is set as follows.

$$Y = \{\{y_{tj}\}_{j=1}^{J}\}_{t=1}^{T} \quad \text{[Math. 14]}$$

Also, the transition probability $\theta$ and the passing probability $\varphi$ are respectively set as follows.

$$\theta = \{\{\{\theta_{jtkk'}\}_{k,k' \in L}\}_{t=1}^{T}\}_{j=1}^{J} \quad \text{[Math. 15]}$$

$$\varphi = \{\{\{\varphi_{jtkk'}\}_{k,k' \in L}\}_{t=1}^{T}\}_{j=1}^{J} \quad \text{[Math. 16]}$$

Here, the people count estimation unit 114 can estimate the number of people that are to pass and the congestion degree in the following manner.

The number of pedestrians who have started traveling on the route j at the time t' is defined as $y_{jt'}$. Also, the number of pedestrians present on the k-th road at the time t, out of the pedestrians who have started traveling on the route j at the time t', is defined as $z_{jt'kt}$. When the time t is t' (t=t'), all of the pedestrians are present at the start point, and thus the following Expression (7) is obtained.

[Math. 17]

$$z_{jt'kt'} = \begin{cases} y_{jt'} & k = 1 \\ 0 & \text{otherwise} \end{cases} \quad (7)$$

Also, the number of people to be present at the next time can be calculated with the following Expression (8) using the transition probability $\theta$ and the number of people at previous time.

[Math. 18]

$$z_{jt'k,t+1} = \sum_{k'=1}^{k} \theta_{jt'k'k} z_{jt'k't'} \quad (8)$$

On the other hand, out of the pedestrians who have started traveling on the route j at the time t', the number of pedestrians passing through the k-th road at the time t can be calculated by the following Expression (9).

[Math. 19]

$$s_{jt'kt} = \sum_{k'=1}^{k} z_{jt'k't} \phi_{jtk'k} \quad (9)$$

Here, since the number of people $x_{ti}$ passing on the road i at the time t is the sum of the number of people passing on the overall route, the people count estimation unit 114 estimates the passing people count using the following Expression (10).

[Math. 20]

$$\hat{x}_{ti} = \sum_{j=1}^{J} \sum_{t'=1}^{t} \sum_{k=1}^{K_j} \delta(i = r_{jk}) s_{jt'kt} \qquad (10)$$

Similarly, the people count estimation unit 114 estimates the congestion degree using the following Expression (11).

[Math. 21]

$$\hat{c}_{ti} = \frac{1}{d_i w_i} \sum_{j=1}^{J} \sum_{t'=1}^{t} \sum_{k=1}^{K_j} \delta(i = r_{jk}) z_{jt'kt} \qquad (11)$$

Where, $\delta(i=r_{jk})$ is a function that returns 1 when $i=r_{jk}$ is satisfied, and otherwise returns 0.

The learning unit 115 learns the per-route people count Y, the congestion degree C., and the parameters $\sigma$, a, b, and $v_{max}$, so that the passing people count estimated by the people count estimation unit 114 approximates the observed passing people count (that is, the passing people count information $X_{obs}$) as much as possible, and the congestion degree estimated by the people count estimation unit 114 approximates the congestion degree used by the probability estimation unit 113 as much as possible. That is to say, the learning unit 115 learns the per-route people count Y, the congestion degree C., and the parameters $\sigma$, a, b, and $v_{max}$, so that, for example, an object function E given by the following Expression (12) is minimized.

[Math. 22]

$$E(\Omega) = \frac{1}{2T|L_{obs}|}\sum_{t=1}^{T}\sum_{i \in L_{obs}}(x_{ti}-\hat{x}_{ti})^2 + \frac{\lambda}{2T|L|}\sum_{t=1}^{T}\sum_{i \in L}(c_{ti}-\hat{c}_{ti})^2 \qquad (12)$$

Where $\Omega$ is defined as $\Omega=\{Y, C, \sigma, a, b, v_{max}\}$ as described above. Also, $\lambda \geq 0$ is a hyper parameter. Note that in the above-described Expression (12), a square error is used as the object function, but the present invention is not limited to this, and for example, another error such as a negative log likelihood may be used as the object function.

The estimation performed by the probability estimation unit 113, the estimation performed by the people count estimation unit 114, and the learning performed by the learning unit 115 are repeatedly executed until a predetermined termination condition is satisfied.

The termination condition determination unit 116 determines whether or not the predetermined termination condition is satisfied. Examples of the predetermined termination condition include a condition that the number of the above-described repetitions reaches a predetermined number of times, a condition that the amount of change of the object function value is a predetermined threshold or less, and a condition that the amount of change of the estimation value (that is, the passing people count and the congestion degree estimated by the people count estimation unit 114) is a predetermined threshold or less. Note that as a result of the route travel model $\Omega$ being learned, the per-route people count Y is also obtained.

If it is determined by the termination condition determination unit 116 that the predetermined termination condition is satisfied, the output unit 117 outputs the route travel model $\Omega$ learned by the learning unit 115. Note that the output unit 117 may also output (save) the learned route travel model $\Omega$ to the storage unit 102, or output it to another device (such as the estimation device 20, for example) connected via a communication network.

<<Estimation Device 20>>

As shown in FIG. 1, the estimation device 20 according to the embodiment of the present invention includes an estimation processing unit 201 and a storage unit 202.

The estimation processing unit 201 executes processing (hereinafter, referred to also as "estimation processing") for estimating the number of passing people for each road using the learned route travel model. The storage unit 202 stores various types of data (such as route information, passing people count information, and parameters of the learned route travel model, for example) for use in the estimation processing, and processing results of the estimation processing (such as the number of passing people for each road, for example).

Here, the estimation processing unit 201 includes an input unit 211, a probability estimation unit 212, a people count estimation unit 213, and an output unit 214.

The input unit 211 inputs the route information R, the on-route people count information $X_{obs}$, and the learned route travel model $\Omega$. Note that the input unit 211 may input the route information R, the on-route people count information $X_{obs}$, and the learned route travel model $\Omega$ that are stored in the storage unit 202, or receive the route information R, the on-route people count information $X_{obs}$, and the learned route travel model $\Omega$ from another device connected via a communication network, and input the received information. Alternatively, the input unit 211 may input any of the route information R, the on-route people count information $X_{obs}$, and the learned route travel model $\Omega$ from the storage unit 202, and may receive the remaining part thereof from another device and input it.

The probability estimation unit 212 estimates a transition probability and a passing probability, using the congestion degree C. and the parameters $\sigma$, a, b, and $v_{max}$ contained in the learned route travel model $\Omega$, and the route information R. Similar to the probability estimation unit 113 of the learning processing unit 101, the probability estimation unit 212 needs only to estimate the passing probability $\varphi_{jtkk'}$ using the above-described Expressions (1), (3), (4), and (5). Also, similar to the probability estimation unit 113 of the learning processing unit 101, the probability estimation unit 212 needs only to estimate the transition probability $\theta_{jtkk'}$ using the above-described Expression (6).

The people count estimation unit 213 estimates the passing people count, using the per-route people count Y contained in the learned route travel model $\Omega$, the transition probability $\theta$, and the passing probability $\varphi$. Similar to the people count estimation unit 114 of the learning processing unit 101, the people count estimation unit 213 needs only to estimate the passing people count using the above-described Expressions (7), (8), (9), and (10). Accordingly, the number of passing people for each road is obtained.

The output unit 214 outputs the passing people count estimated by the people count estimation unit 213. Note that the output unit 214 may output (save) the passing people count to the storage unit 103, or output it to another device connected via a communication network.

Here, in the embodiment of the present invention, the description is given assuming that the learning device 10 and the estimation device 20 are different devices, but the learning device 10 and the estimation device 20 may be realized by a single device. In this case, this device needs only to be designed to include the learning processing unit 101, the estimation processing unit 201, and a storage unit.

<Hardware Configuration of Learning Device 10 and Estimation Device 20>

Figure 2:
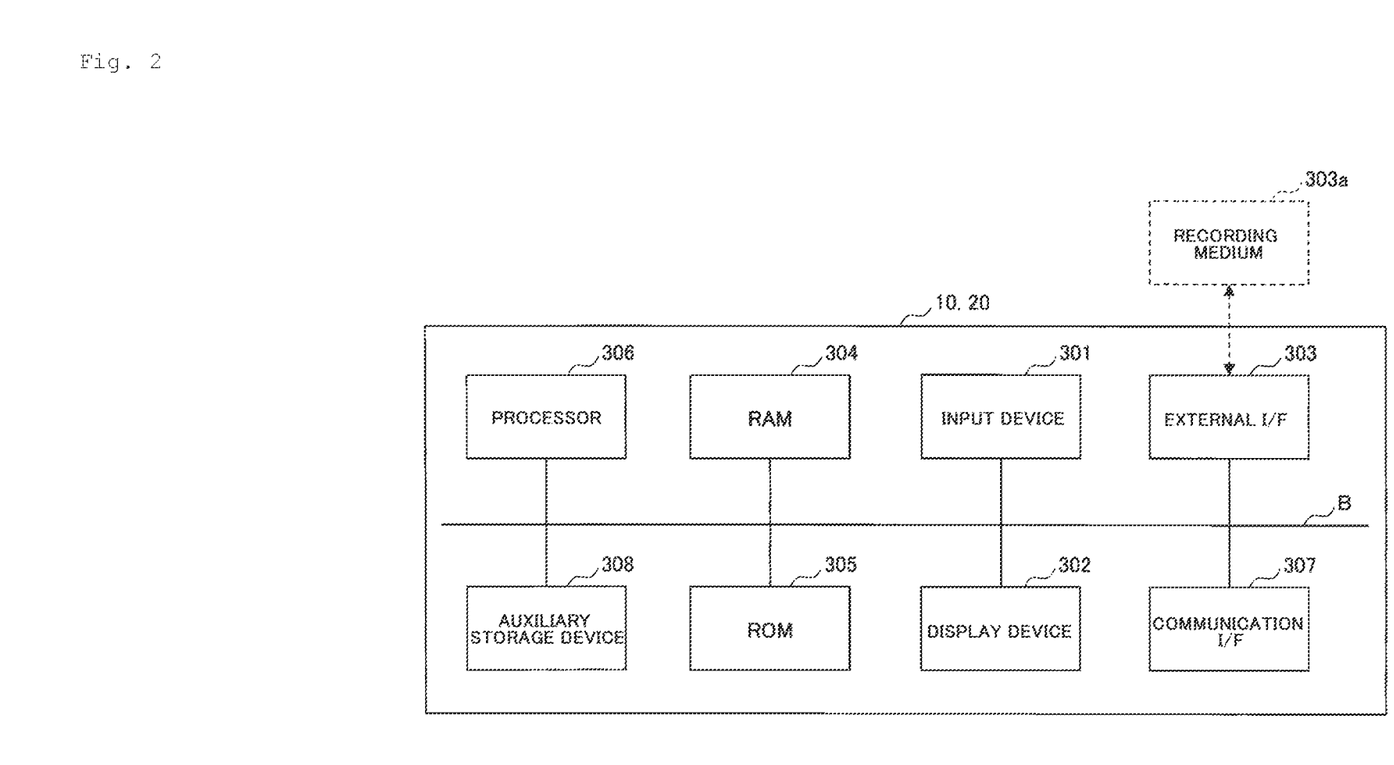
FIG. 2 is a diagram illustrating an example of a hardware configuration of the learning device and the estimation device according to the present invention.

The following will describe hardware configuration of the learning device 10 and the estimation device 20 according to the embodiment of the present invention with reference to FIG. 2. FIG. 2 is a diagram illustrating an example of the hardware configuration of the learning device 10 and the estimation device 20 according to the embodiment of the present invention. Note that the learning device 10 and the estimation device 20 can be realized with the same hardware configuration, and thus the following will mainly describe the hardware configuration of the learning device 10.

As shown in FIG. 2, the learning device 10 according to the embodiment of the present invention includes an input device 301, a display device 302, an external I/F 303, a RAM (Random Access Memory) 304, a ROM (Read Only Memory) 305, a processor 306, a communication I/F 307, and an auxiliary storage device 308. These pieces of hardware are connected so as to communicate with each other via a bus B.

The input device 301 is, for example, a keyboard, a mouse, a touch panel, or the like, and is used when a user inputs various operations. The display device 302 is, for example, a display or the like, and displays a processing result of the learning device 10, and the like. Note that the learning device 10 and the estimation device 20 do not necessarily include at least either of the input device 301 and the display device 302.

The external I/F 303 is an interface with an external device. Examples of the external device include a recording medium 303a. The learning device 10 can perform reading, writing, and the like with respect to the recording medium 303a via the external I/F 303. For example, one or more programs for realizing the learning processing unit 101, one or more programs for realizing the estimation processing unit 201, and the like may be recorded on the recording medium 303a.

Examples of the recording medium 303a include a flexible disk, a CD (Compact Disc), a DVD (Digital Versatile Disk), a SD memory card (Secure Digital memory card), and a USB (Universal Serial Bus) memory card.

The RAM 304 is a volatile semiconductor memory that temporarily stores a program or data. The ROM 305 is a nonvolatile semiconductor memory that can store a program and data even when it is turned off. For example, OS (Operating System)-related setting information, communication network-related setting information, and the like are stored in the ROM 305.

The processor 306 is, for example, a CPU (Central Processing Unit), a GPU (Graphics Processing Unit), or the like, and is an arithmetic device that reads a program and data from the ROM 305, the auxiliary storage device 308, and the like onto the RAM 304 to execute processing. The learning processing unit 101 is realized by the processor 306 reading one or more programs stored in the ROM 305, the auxiliary storage device 308, and the like onto the RAM 304 and executing processing. Similarly, the estimation processing unit 201 is realized by the processor 306 reading one or more programs stored in the ROM 305, the auxiliary storage device 308, and the like onto the RAM 304 and executing processing.

The communication I/F 307 is an interface for connecting the learning device 10 to a communication network. One or more programs that realize the learning processing unit 101, and one or more programs that realize the estimation processing unit 201 may be obtained (downloaded) from a predetermined server device or the like via the communication I/F 307.

The auxiliary storage device 308 is, for example, an HDD (Hard Disk Drive), an SSD (Solid State Drive), or the like, and is a nonvolatile storage device having stored therein programs and data. Examples of the programs and data stored in the auxiliary storage device 308 include an OS, and application programs that realize various types of functions on this OS. Also, the auxiliary storage device 308 of the learning device 10 has stored therein one or more programs that realize the learning processing unit 101. Similarly, the auxiliary storage device 308 of the estimation device 20 has stored therein one or more programs that realize the estimation processing unit 201.

Also, the storage unit 102 included in the learning device 10 can be realized by the auxiliary storage device 308, for example. Similarly, the storage unit 202 included in the estimation device 20 can be realized by the auxiliary storage device 308, for example.

As a result of having the hardware configuration shown in FIG. 2, the learning device 10 of the embodiment of the present invention can realize various types of processing, which will be described later. Similarly, as a result of having the hardware configuration shown in FIG. 2, the estimation device 20 of the embodiment of the present invention can realize various types of processing, which will be described later.

Note that the example shown in FIG. 2 indicates a case where the learning device 10 and the estimation device 20 of the embodiment of the present invention are each realized by one device (computer), but the present invention is not limited to this. At least either of the learning device 10 and the estimation device 20 of the embodiment of the present invention may be realized by a plurality of devices (computers). Also, one device (computer) may include a plurality of processors 306 and a plurality of memories (such as the RAM 304, the ROM 305, and the auxiliary storage device 308).

<Learning Processing>

Figure 3:
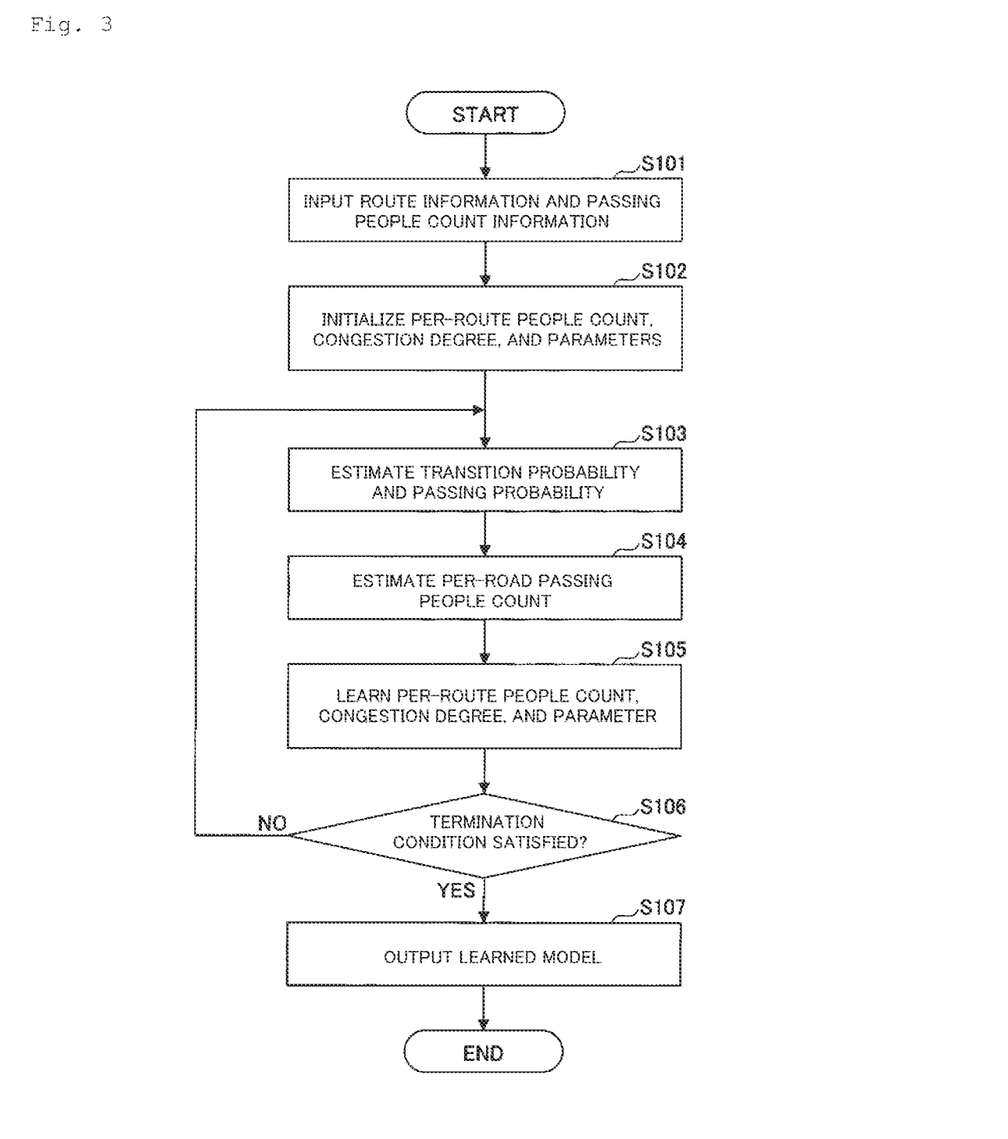
FIG. 3 is a flowchart illustrating an example of learning processing according to the embodiment of the present invention.

The following will describe the learning processing according to the embodiment of the present invention with reference to FIG. 3. FIG. 3 is a flowchart showing an example of the learning processing according to the embodiment of the present invention.

First, the input unit 111 inputs the route information R and the on-route people count information $X_{obs}$ (step S101).

Then, the initialization unit 112 initializes the per-route people count Y, the congestion degree C., and the parameters σ, a, b, and $v_{max}$ (step S102). Note that the initialization unit 112 needs only to perform initialization to a suitable value, such as initialization to a random value, for example.

Then, the probability estimation unit 113 estimates the transition probability θ and the passing probability φ, using the congestion degree C. and the route information R (step S103). The probability estimation unit 113 needs only to estimate the transition probability θ using, for example, the above-described Expressions (1), (3), (4), and (5). Also, the probability estimation unit 113 needs only to estimate the passing probability φ, using the above-described Expression (6).

Then, the people count estimation unit 114 estimates the passing people count and the congestion degree, using the per-route people count Y, the transition probability θ, and the passing probability φ (step S104). The people count estimation unit 114 needs only to estimate the passing people count using the above-described Expressions (7), (8), (9), and (10). Also, the people count estimation unit 114 needs only to estimate the congestion degree using the above-described Expressions (7), (8), and (11).

Then, the learning unit 115 learns the per-route people count Y, the congestion degree C., and the parameters σ, a, b, and $v_{max}$, using the passing people count and the congestion degree estimated in step S104 (step S105). That is to say, the learning unit 115 learns (updates) the per-route people count Y, the congestion degree C., and the parameters σ, a, b, and $v_{max}$, so that the object function E given by the above-described Expression (12) is minimized, for example.

Note that when the congestion degree (such as the population density and population) is observed on any of the roads, the observed congestion degree is used as $c_{fi}$ and can be eliminated from the learning targets. Also, when the passing people count has not been observed (that is, such as a case where $X_{obs}$ has not been input and a case where $X_{obs}$ is an empty set) but the congestion degree has solely observed, the embodiment of the present invention can be applied in the same manner, by eliminating the first term of the object function E given by the above-described Expression (12), for example. Also, when the congestion degree for a combination of a plurality of roads has been observed, a term that is reduced as the observed congestion degree and its estimation value approximate to each other is added to the object function E, and thereby it is possible to perform estimation using this observation. For example, a term that is reduced as an average or sum of estimation values of the congestion degrees of a plurality of roads approximates the observed congestion degree needs only to be added to the object function E.

Then, the termination condition determination unit 116 determines whether or not the predetermined termination condition is satisfied (step S106).

If it is determined in step S106 that the predetermined termination condition is not satisfied, the learning processing unit 101 returns to step S103 described above. Accordingly, steps S103 to S105 are repeatedly executed until the predetermined termination condition is satisfied.

On the other hand, if it is determined in step S106 that the predetermined termination condition is satisfied, the output unit 117 outputs the learned route travel model Ω (step S107). Accordingly, the route travel model Ω containing the per-route people count Y is obtained.

<Estimation Processing>

Figure 4:
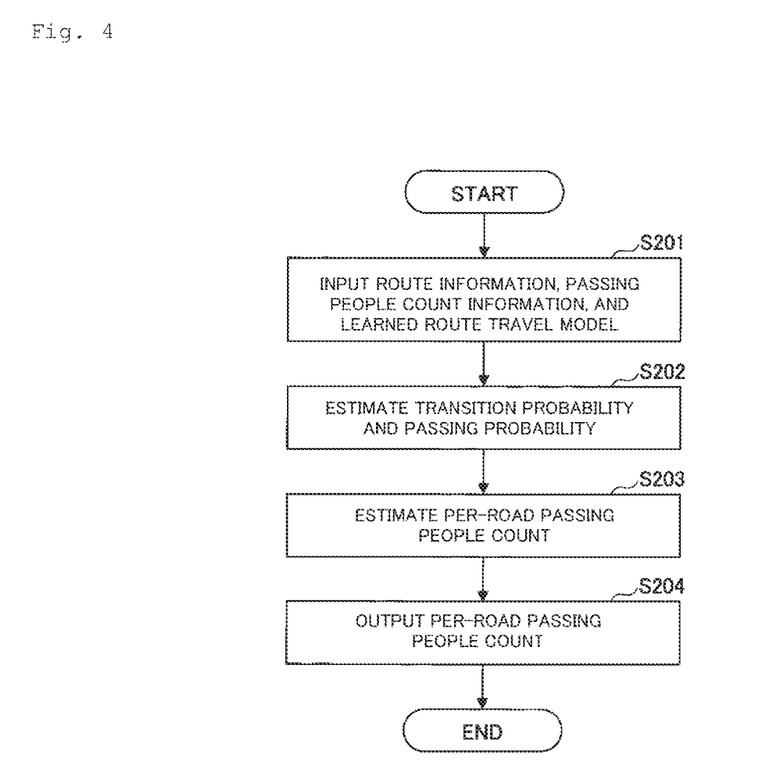
FIG. 4 is a flowchart illustrating an example of estimation processing according to the embodiment of the present invention.

The following will describe the estimation processing according to the embodiment of the present invention with reference to FIG. 4. FIG. 4 is a flowchart showing an example of the estimation processing according to the embodiment of the present invention.

First, the input unit 211 inputs the route information R, the on-route people count information $X_{obs}$, and the learned route travel model Ω (step S201).

Then, the probability estimation unit 212 estimates the transition probability θ and the passing probability φ, using the congestion degree C. and the parameters σ, a, b, and $v_{max}$ contained in the learned route travel model Ω, and the route information R (step S202). The probability estimation unit 212 needs only to estimate the passing probability using the above-described Expressions (1), (3), (4), and (5), and estimate the transition probability θ using the above-described Expression (6).

Then, the people count estimation unit 213 estimates the passing people count, using the per-route people count Y contained in the learned route travel model Ω, the transition probability θ, and the passing probability φ (step S203). The people count estimation unit 213 needs only to estimate the passing people count using the above-described Expressions (7), (8), (9), and (10). Accordingly, the number of passing people for each road is obtained.

Then, the output unit 214 outputs the number of passing people estimated in step S203 above (step S204).

<Comparison to Conventional Technique>

The following will describe a comparison result between the present invention and conventional techniques. In the comparison between the present invention and the conventional techniques, experiments were conducted using Japanese road information and a pedestrian simulator. At this time, the experiments were conducted by changing the ratio of roads that have not yet been observed to 0.1, 0.3, 0.5, and 0.7. As the conventional techniques to which the present invention was compared, a method that uses an average (Mean), a k-nearest neighbor method (KNN), a Gaussian process (GP), a graph convolutional neural network (GCN), and a network tomographic model (NTM) were used. Estimated errors in the number of passing people for each road at this time are shown in Table 1 below.

TABLE 1

| Method | Missing0.1 | Missing0.3 | Missing0.5 | Missing0.7 |
|---|---|---|---|---|
| Mean | 219.5 ± 8.8 | 217.2 ± 7.6 | 217.4 ± 8.1 | 219.1 ± 8.3 |
| RNN | 171.7 ± 5.6 | 185.4 ± 6.2 | 191.0 ± 6.0 | 207.3 ± 6.8 |
| GP | 259.2 ± 12.8 | 254.7 ± 10.9 | 254.2 ± 11.2 | 256.5 ± 11.5 |
| GCN | 164.7 ± 8.8 | 179.3 ± 8.5 | 196.5 ± 9.4 | 211.1 ± 8.7 |
| NTM | 74.2 ± 4.1 | 78.9 ± 4.4 | 82.4 ± 4.2 | 121.9 ± 5.3 |
| Present invention | 60.9 ± 4.5 | 65.5 ± 4.7 | 79.9 ± 5.3 | 87.9 ± 6.4 |

Where Missing0.1, Missing0.3, Missing0.5, and Missing0.7 mean that the respective ratios of roads that have not yet been observed are 0.1, 0.3, 0.5, and 0.7. As shown in Table 1, it is clear that the present invention has the smallest estimated error.

Also, estimated errors in the per-route people count are shown in Table 2 below.

TABLE 2

| Method | Missing0.0 | Missing0.1 | Missing0.3 | Missing0.5 | Missing0.7 |
|---|---|---|---|---|---|
| NYM | 59.5 ± 0.5 | 59.8 ± 0.5 | 60.6 ± 0.5 | 61.1 ± 0.5 | 62.4 ± 0.5 |
| Present invention | 54.1 ± 0.8 | 54.3 ± 0.8 | 54.9 ± 0.9 | 55.6 ± 0.8 | 57.9 ± 0.8 |

Where Missing0.0, Missing0.1, Missing0.3, Missing0.5, and Missing0.7 mean that the respective ratios of roads that have not yet been observed are 0.0, 0.1, 0.3, 0.5, and 0.7. As shown in Table 2, it is clear that the present invention has an estimated error smaller than that of NTM.

The present invention is not limited to the foregoing embodiment that has been specifically disclosed, and various modifications and changes may be made without departing from the scope of claims.

REFERENCE SIGNS LIST

10 Learning device
20 Estimation device
101 Learning processing unit
102 Storage unit
111 Input unit
112 Initialization unit
113 Probability estimation unit 114 People count estimation unit
115 Learning unit
116 Termination condition determination unit
117 Output unit
201 Estimation processing unit
202 Storage unit
211 Input unit
212 Probability estimation unit
213 People count estimation unit
214 Output unit

The invention claimed is:

1. A learning device comprising:
a receiver configured to receive route information on a set of routes each constituted by one or more ways, and passing mobile object information that indicates the number of passing mobile objects on an observed way, out of the one or more ways, at each time point; and
a learner configured to learn parameters of a model in which a travel speed of the mobile objects is taken into consideration, using the route information and the passing mobile object information,
wherein the parameters include a per-route mobile object count, which indicates the number of mobile objects for each route, and a congestion degree that indicates a congestion level on each of the one or more ways, the learner;
determines a predetermined first probability and a predetermined second probability, using the route information and the congestion degrees,
estimates the number of mobile objects that are to pass on the one or more ways at each time point, and the congestion degrees, using the per-route mobile object count, the first probability, and the second probability, and
updates the parameters, using the estimated number of mobile objects to pass, the number of passing mobile objects indicated by the passing mobile object information, the estimated congestion degrees, and the congestion degrees that were used in determining the first probability and the second probability.

2. The learning device according to claim 1, wherein the mobile objects include a pedestrian.

3. The learning device according to claim 1, wherein the one or more ways include at least one of a road or a walkway in an event site.

4. The learning device according to claim 1, wherein the first probability corresponds to a transition probability, wherein the transition probability indicates a probability of the mobile object moving from a first way to a second way on a route at a time.

5. The learning device according to claim 1, wherein the second probability corresponds to a passing probability, wherein the passing probability indicates a probability of a mobile object present on a first way in a route passing on a second way at a time.

6. An estimation device comprising:
a receiver configured to:
receive route information on a set of routes each constituted by one or more ways,
pass mobile object information that indicates the number of passing mobile objects on an observed way, out of the one or more ways, at each time point, and learned parameters of a model that is used to estimate the number of mobile objects that are to pass on the one or more ways at each time point taking into consideration a travel speed of the mobile objects; and
an estimator configured to estimate the number of mobile objects that are to pass on the one or more ways at each time point, based on the model, using the route information, the passing mobile object information, and the learned parameters of the model
wherein the learned parameters include:
a per-route mobile object count, which indicates the number of mobile objects for each route, and
a congestion degree that indicates a congestion level on each of the one or more ways, and wherein the estimator determines a predetermined first probability and a predetermined second probability, using the route information and the congestion degrees, and estimates the number of mobile objects that are to pass on the one or more ways at each time point, using the per-route mobile object count, the first probability, and the second probability.

7. The estimation device according to claim 6, wherein the mobile objects include a pedestrian.

8. The estimation device according to claim 6, wherein the one or more ways include at least one of a road or a walkway in an event site.

9. The estimation device according to claim 6, wherein the first probability corresponds to a transition probability, wherein the transition probability indicates a probability of the mobile object moving from a first way to a second way on a route at a time.

10. The estimation device according to claim 6, wherein the second probability corresponds to a passing probability, wherein the passing probability indicates a probability of a mobile object present on a first way in a route passing on a second way at a time.

11. A method, the method comprising:
receiving, by a receiver, training route information on a set of training routes each constituted by one or more training ways, and passing mobile object information for learning, the passing mobile object information for learning indicating the number of passing mobile objects on an observed way for learning, out of the one or more ways for learning, at each time point for learning; and
learning, by a learner, parameters of a model for learning in which a travel speed of the mobile objects is taken into consideration, using the training route information and the passing learning mobile object information,
wherein the parameters include a per-route mobile object count, which indicates the number of mobile objects for each route, and a congestion degree that indicates a congestion level on each of the one or more ways, the learner:
determining a predetermined first probability and a predetermined second probability, using the route information and the congestion degrees,
estimating the number of mobile objects that are to pass on the one or more ways at each time point, and the congestion degrees, using the per-route mobile object count, the first probability, and the second probability, and
updating the parameters, using the estimated number of mobile objects to pass, the number of passing mobile objects indicated by the passing mobile object information, the estimated congestion degrees, and the congestion degrees that were used in determining the first probability and the second probability.

12. A method according to claim 11 the method further comprising:
   receiving, by the receiver, route information on a set of routes each constituted by one or more ways for estimating;
   passing mobile object information that indicates the number of passing mobile objects on an observed way, out of the one or more ways, at each time point, and learned parameters of a model that is used to estimate the number of mobile objects that are to pass on the one or more ways at each time point taking into consideration a travel speed of the mobile objects; and
   estimating, by an estimator, the number of mobile objects that are to pass on the one or more ways at each time point, based on the model, using the route information, the passing mobile object information, and the learned parameters of the model.

13. The method according to claim 12, wherein the learned parameters include:
   a per-route mobile object count, which indicates the number of mobile objects for each route, and
   a congestion degree that indicates a congestion level on each of the one or more ways, and wherein the estimator determines a predetermined first probability and a predetermined second probability, using the route information and the congestion degrees, and estimates the number of mobile objects that are to pass on the one or more ways at each time point, using the per-route mobile object count, the first probability, and the second probability.

14. The method according to claim 11, wherein the mobile objects include a pedestrian.

15. The method according to claim 11, wherein the one or more ways include at least one of a road or a walkway in an event site.

16. The method according to claim 12, wherein the first probability corresponds to a transition probability, wherein the transition probability indicates a probability of the mobile object moving from a first way to a second way on a route at a time.

17. The method according to claim 12, wherein the second probability corresponds to a passing probability, wherein the passing probability indicates a probability of a mobile object present on a first way in a route passing on a second way at a time.

* * * * *